Feb. 4, 1941.    L. H. BROWNE    2,230,881
ROTARY SEAL
Filed July 27, 1939    4 Sheets-Sheet 1

INVENTOR
Lindsay H. Browne
BY
Van Deventer & Grier
ATTORNEYS

Feb. 4, 1941.  L. H. BROWNE  2,230,881
ROTARY SEAL
Filed July 27, 1939  4 Sheets-Sheet 3

INVENTOR
*Lindsay H. Browne*
BY
*Van Deventer Lein*
ATTORNEYS

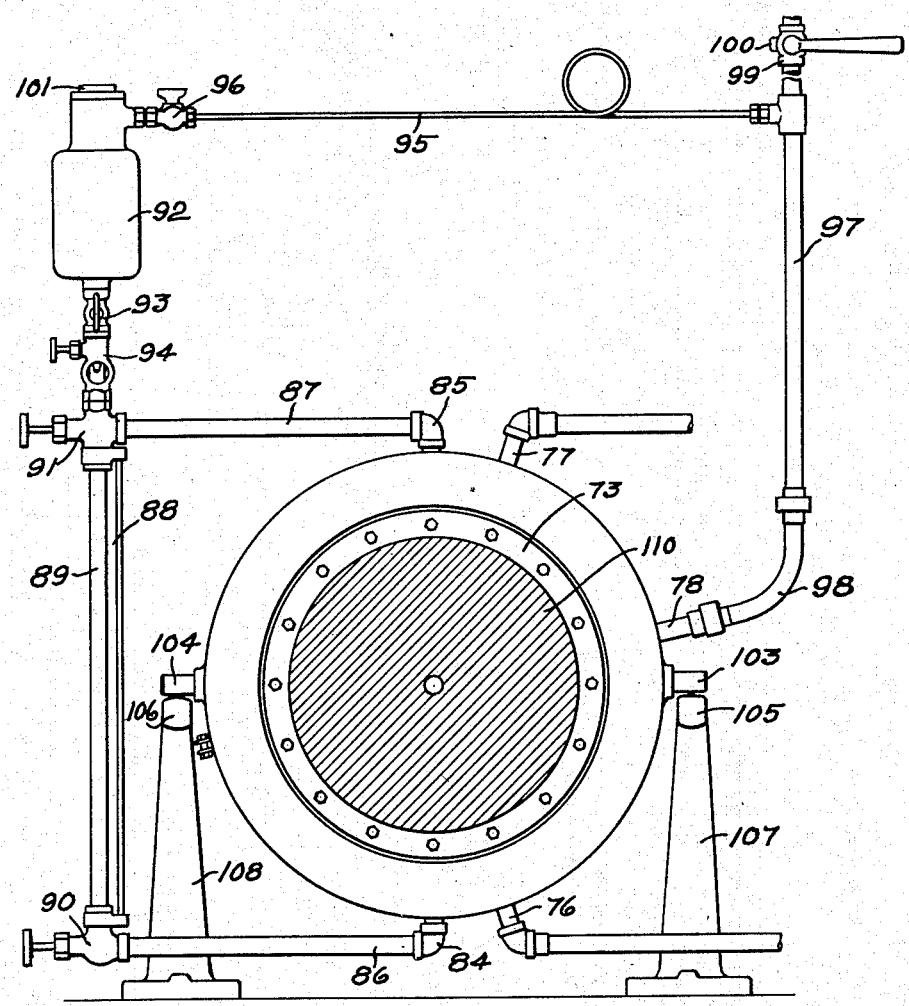
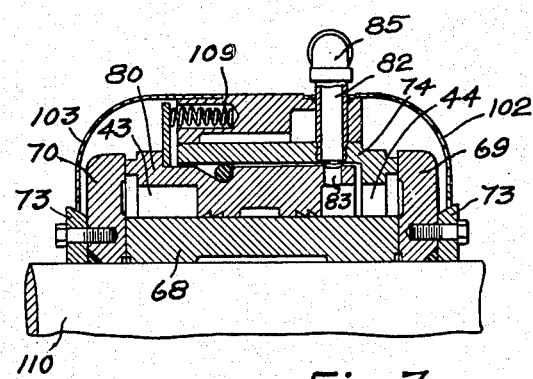
Fig. 8
Fig. 7

Patented Feb. 4, 1941

2,230,881

UNITED STATES PATENT OFFICE 2,230,881

ROTARY SEAL

Lindsay H. Browne, Pittsford, N. Y., assignor, by mesne assignments, to The American Brake Shoe & Foundry Company, a corporation of Delaware Application July 27, 1939, Serial No. 286,750

9 Claims. (Cl. 285—96.3)

This invention relates to improvements in rotary seals.

An object of the invention is to provide improved means by which fluids under pressure may be conducted to or retained in or about rotary shafts without leakage.

Another object is to provide improved means of the above type comprising a straddle seal adapted for use on any desired portion of a shaft.

A further object is to provide a seal of the above type through which pressure fluids such as compressed air, oil, or the like, may be fed to rotary shafts for the operation of pressure actuated devices mounted thereon.

Another object is to provide improved sealing means of the above type in which rotary friction is minimized and which is simple, durable, and readily adaptable to a wide range of applications.

Other objects and advantages will become evident during the course of the following description in connection with the accompanying drawings, in which:

Figure 7 is a fragmental sectional view on the line 7, Figure 6; and

Figure 8 is an end elevation of the device, Figures 5 to 7, illustrating typical piping and related apparatus.

Figure 1:
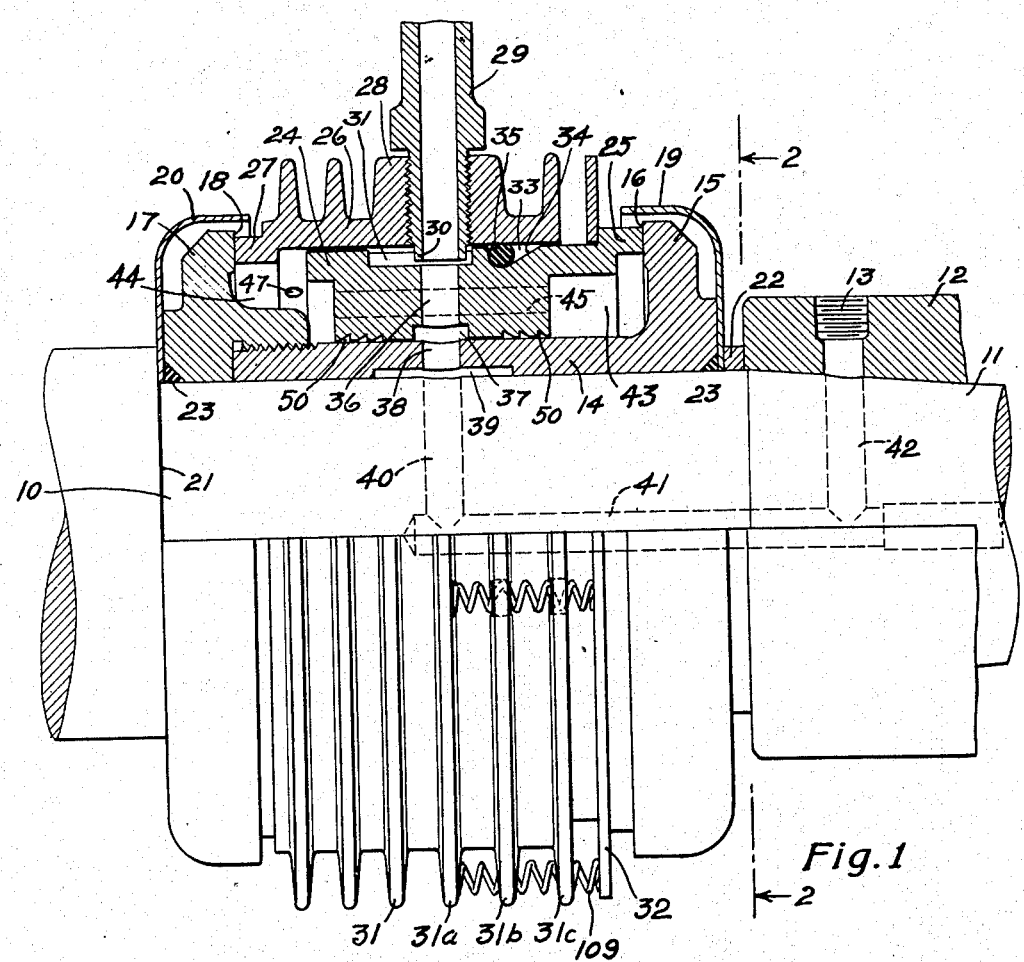
Figure 1 is a longitudinal half-sectional view of one embodiment of the invention.
Figure 2:
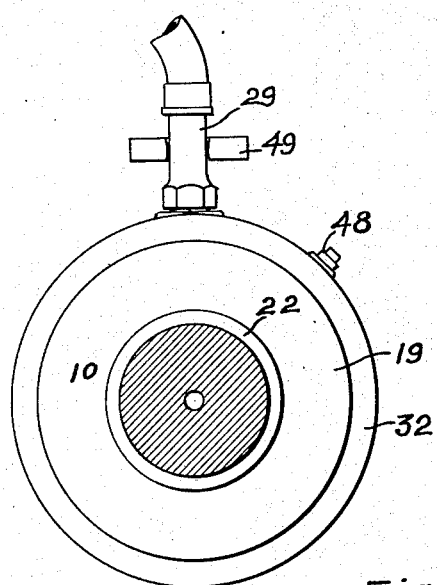
Figure 2 is an end view of the same with the shaft in section on the lines 2—2, Figure 1.

Referring to Figures 1 and 2, the numeral 10 designates a rotary shaft having a tapered portion 11 on which is secured a hub member 12 forming part of a rotary structure to which it is desired to conduct compressed air, oil, or other pressure fluid through a tapped radial supply hole 13.

A sleeve 14, fitted to the outside of shaft 10, has at one end thereof a flange 15 provided with an annular sealing face 16. A second flange member 17, screwed or otherwise secured to the other end of the sleeve 14, also has an annular sealing face 18 directed inwardly, that is, toward the sealing face 16.

Protecting caps or shields 19 and 20, also fitted on the shaft 10, bear against the outer faces of flange members 15 and 17, and the entire sub-assembly of sleeve 14, members 15 and 17, and shields 19 and 20 is clamped longitudinally between a shaft shoulder 21 and a washer 22 backed by the hub 12. Triangular packing rings 23, preferably of synthetic rubber or the like, are disposed within the bevelled inner edges of the flanges 15 and 17 and are wedged by the clamping pressure against the shaft 10, thus establishing fluid-tight seals at these points.

A second or intermediate sleeve member 24, rotatably and slidably mounted on the first sleeve 14, terminates at one end in an outwardly stepped annular sealing shoe 25 engaging the face 16 of the flange. A third sleeve 26, forming an outer casing, is longitudinally slidable on the intermediate sleeve 24 and terminates in a second sealing shoe 27 of substantially the same diameter as shoe 25 and bearing against the seal face 18 of flange 17.

A central boss 28 on the casing or third sleeve 26 has screwed therein a tubular fitting 29, the inner end 30 of which projects into a key-way 31 in the periphery of the intermediate sleeve 24. The end 30 of fitting 29 thus acts as a key to prevent relative rotation between sleeves 24 and 26 while permitting longitudinal movement of these members. The casing sleeve 26 may be provided with cooling flanges 31.

An annular ring 32 is disposed against the rear outer shoulder of the shoe 25, and a plurality of compression springs 109, backed by the central flange 31a and guided in flanges 31b and 31c, press against the ring 32, thus urging the sleeves 24 and 26 longitudinally apart to hold the shoes 25 and 27 in engagement with the flange faces 16 and 18 respectively.

The intermediate sleeve 24 has formed therein a circumferential groove 33, the outer side 34 of the groove being tapered to form a conical surface. A resilient ring or torus 35, preferably of oil resistant synthetic rubber or the like, is disposed in the groove 33 and normally rests in the bottom thereof. In this position the ring 35 is slightly compressed between the bottom of the groove and the inner surface of outer sleeve 26 to form a yielding fluid-tight seal, and in operation this sealing effect is augmented by fluid pressure as hereinafter explained.

The tubular fitting 29 communicates through a radial hole 36 in the intermediate sleeve 24 with an annular recess 27 in the inside of sleeve 24, while one or more holes 38 furnish further communication from the recess 37 through the inner sleeve 14 to a second annular recess 39 inside the latter. A radial hole 40 in the shaft 10 leads inward from the recess 39 to a central passage 41 in the shaft, the passage 41 in turn leading to a second radial passage 42 communicating with the tapped opening 13. It will be seen that the foregoing arrangement provides an open communication between the fitting 29 and the tapped hole 13 at all times irrespective of the rotative position of the shaft 10.

Figure 3:
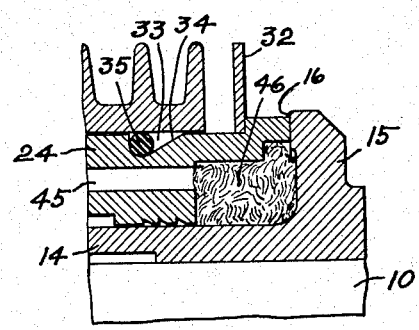
Figure 3 is a fragmental sectional view illustrating the optional use of oil-retaining wicking or waste in the device.

Chambers 43 and 44 in the ends of sleeves 24 and 26 are adapted to contain lubricant, and a plurality of longitudinal holes 45 in the sleeve 24 connects these chambers to equalize pressures and allow passage of lubricant between them. If desired, the chambers 43 and 44 may be filled or partially filled with oil retaining waste or wicking 46 as shown in Figure 3. A suitable oil filler opening 47 in the casing sleeve 26 is closed by a plug 4. Obviously, any other suitable type of closure such as an Alemite fitting may be used. In case the pressure fluid is itself a lubricant, as in the case of oil under pressure, of course the filler may be omitted.

Assuming it is desired to admit fluid under pressure to a pressure responsive device connected to the tapped hole 13, the seal performs its function as follows:

The pressure fluid, for example, compressed air, is admitted through the tubular fitting 29 from which it passes through the hole 36, annular recess 37, hole 39, second annular recess 39 and the passages 40, 41 and 42, thence through the tapped hole 13 to the apparatus to be operated by pressure.

When the shaft 10 rotates, it carries with it the sleeve 14 and flanged members 15 and 17 attached thereto. The casing 26 may be prevented from rotation by any suitable type of stop, as illustrated by the stationary yoke 49, Figure 2, which engages the tubular fitting 29. As the flanges 15 and 17 rotate with the shaft, the shoes 25 and 27 are pressed against the faces 16 and 18 in sealing relation therewith by the springs 109, compressed air from the fitting 29 passes between the mating surfaces of intermediate sleeve 24 and casing sleeve 26 into the chamber 44, these mating surfaces having substantial working clearance as hereinafter set forth.

The pressure in chamber 44 is communicated through the holes 45 into the chamber 43, wherein it is sealed from escape to the atmosphere by the shoes 25 and 27 bearing against the flange faces 16 and 18. Leakage to the atmosphere between the outer sleeve 26 and the intermediate sleeve 24 is prevented by the resilient sealing ring 35 which, as previously stated, is compressed between the two in the groove 33. The initial resilient sealing effect of the ring 35 is augmented upon increase of pressure in the following manner:

Compressed air enters the groove 33 behind, that is to say, to the left of the ring 35 and forces the latter against the tapered side 34 of the groove, thereby wedging the ring 35 more tightly against the inner surface of sleeve 26. By this means, it will be seen that the sealing effect of the resilient ring is increased in proportion to any increase in the pressure which it must withstand, but that due to the resilience of the ring, longitudinal motion between the outer and intermediate sleeves is not restrained thereby.

The circular shape of the ring 35, by allowing the latter a certain rolling action, assists the ring's resilience in easily yielding to end motion between the exterior and intermediate sleeve.

It will further be seen from Figure 1, that the external diameter of the intermediate sleeve 24 within the casing 26 and the internal diameter of the latter are substantially the same as the mean diameter of the annular surfaces of engagement between the shoes 25 and 27 and the faces 16 and 18 respectively and that the effective areas responsive to internal pressure to force the sleeves outward are small. By this construction, the seal is substantially balanced against variations in internal pressure, such variations causing comparatively little change in the total pressure between the sealing surfaces so that the use of high pressure within the mechanism does not cause excessive friction and wearing of the seal.

As previously stated, the fit between the intermediate sleeve 24 and the casing sleeve 26 may be somewhat loose and similarly the fit between the internal sleeve 14 and the intermediate sleeve 24 may be such as to allow slight play between these members. The purpose of this arrangement is to allow the sealing sleeves a slight degree of freedom to float and thus follow any slight inaccuracies in alignment of the flanges 15 and 17 without losing their accurate sealing contact with the faces thereof.

To prevent undue leakage of lubricant from the chambers 43 and 44 into the main air passages, internal grooves 50 are provided in the inside surface of the sleeve 24. In case the device is to be used on shafts rotating always in the same direction, the grooves 50 may be formed as continuous helical threads with the direction of advance such as to repel lubricant when the shaft is rotated. In the case of seals for shaft operation in either direction, these grooves take the form of separate annular grooves after the well known manner of a labyrinth stuffing box.

Figure 4:
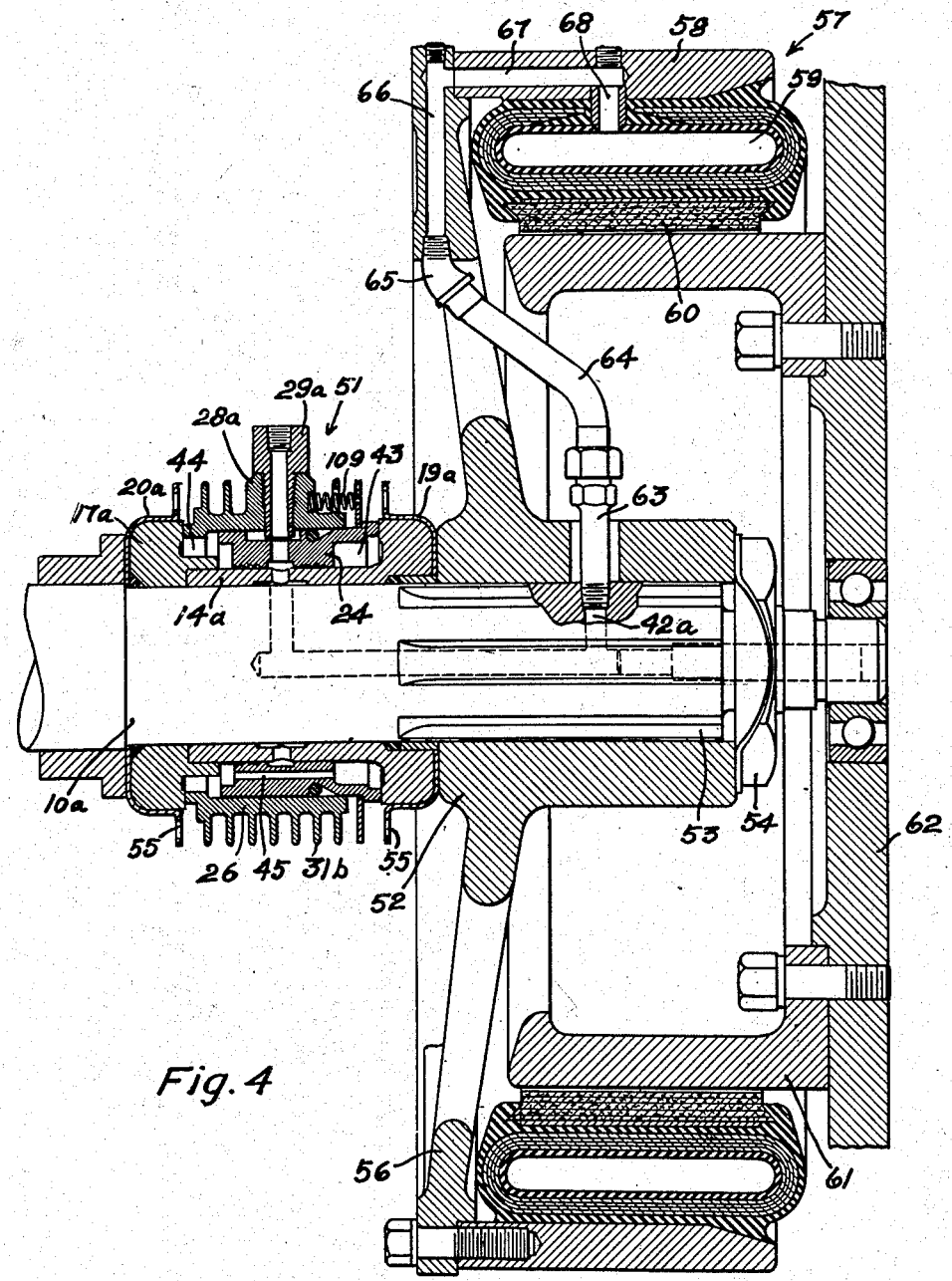
Figure 4 is a longitudinal sectional view illustrating the use of the invention with a pneumatic clutch.

Figure 4 illustrates the application of the invention to a pneumatic clutch of a type used on certain tractors and the like. In this application the seal, generally denoted by the numeral 51, is substantially the same as previously described with slight modifications in structure to correspond with the particular construction of the clutch and to provide the clearest showing. The internal or first sleeve 14a and flange member 17a are clamped together and to the shaft 10a by the hub 52 which is mounted on splines 53 and is held tightly in clamping position by the usual nut 54. The end shields 19a and 20a are flared outward and provided with holes 55 for attachment to certain covering members used in the clutch structure but not shown herein. The springs 109 are shorter than in Figure 1, and extend only to the cooling flange 31b, one of these springs being shown as socketed in the side of the boss 28a for purposes of clarity.

The hub 52 carries and forms part of a spoked driven member 56 of the clutch 57. The member 56 has bolted thereto a ring 58 in which a flattened resilient tube 59 is secured in suitable manner as by vulcanizing. A contractible friction band 60, secured to the inside of the tube 59, surrounds a drum 61 comprising the driving member of the clutch, the drum being bolted to a rotary plate 62 adapted to be secured in any suitable manner to the driving end of the engine shaft or flywheel.

A tubular fitting 63, a flexible tube 64 and a second fitting 65 are adapted to carry compressed air from the shaft passage 42a to communicating passages 66, 67 and 68 leading to the interior of the tube 59.

It will be understood that the showing and description of the clutch 57 itself are included herein for the purpose of clearly illustrating the application of the present invention to such structures.

When no positive pressure exists in the tube 59 the band 60 is spaced from the driving member 61 and the clutch is disengaged. When it is desired to engage the clutch compressed air is admitted from any suitable valve, piping and source of supply through the seal 51 and the various passages described to the interior of the tube 59 which is thereby inflated, contracting the band 60 into frictional driving engagement with driving member 61. The driven member 58 and shaft 10a are thereby revolved to transmit the required power.

Similarly, when pressure is released through the seal 51, tube 59 is deflated and the band 60 expands out of engagement with the driving member 61, thus disengaging the clutch. At all times while pressure exists in the apparatus, either running or stopped, the seal apparatus 51 operates in the manner previously described to prevent leakage and consequent loss of compressed air. If for any reason the pressure of the main air supply is liable to drop while the clutch is engaged, the main supply may be shut off, and the fluid-tightness of the sealing means will retain the trapped pressure indefinitely.

Figure 5:
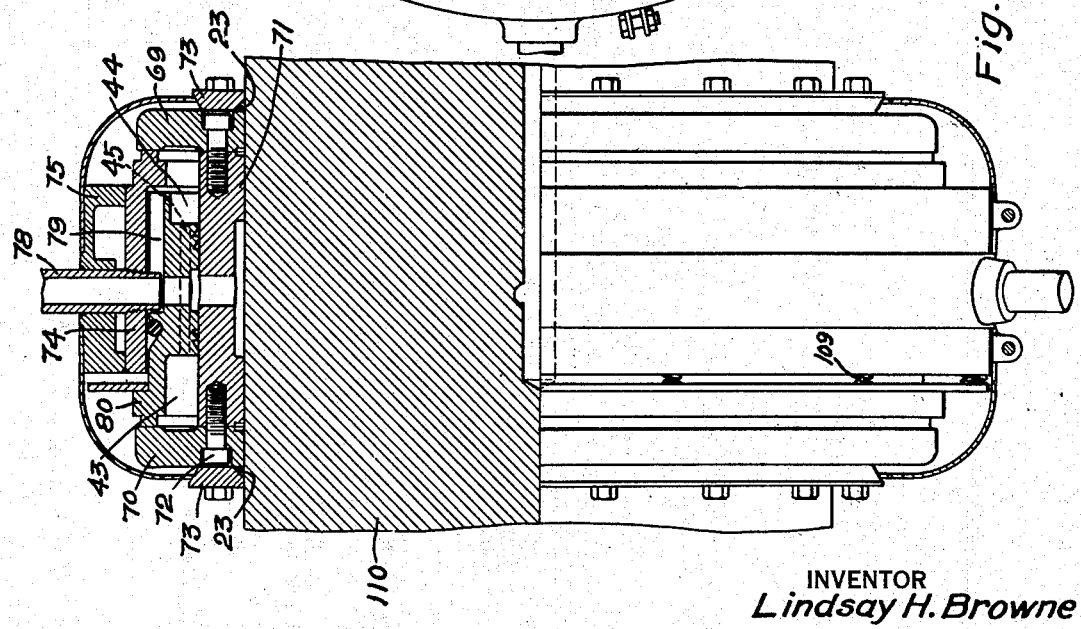
Figure 5 is a longitudinal view of an alternative form for use with large shafts, the view being taken on the lines 5—5, Figure 6.

Figures 5 to 8 illustrate the manner in which the invention is constructed for use on large shafts such as those employed in marine Diesel practice and the like. Referring to Figures 5 and 7, it will be seen that the flanges 69 and 70 are secured to the first or rotary sleeve 71 by socket-head screws 72. Exterior collars 73, in turn bolted to the flanges 69 and 70 as shown in Figure 7, wedge the packing rings 23 tightly against the shaft 110 and thus clamp the assembly thereto. It is evident that this clamping structure permits the device to be employed at any desired point on a run of shaft of proper diameter, no shoulders or other locating means being required on the shaft itself. It is further evident that the entire seal assembly forms a unitary structure adapted to be placed on or removed from a shaft bodily, without any disassembly or relative disturbance of the parts of the seal itself, this latter advantage also being present in the embodiment shown in Figure 1.

Figure 6:
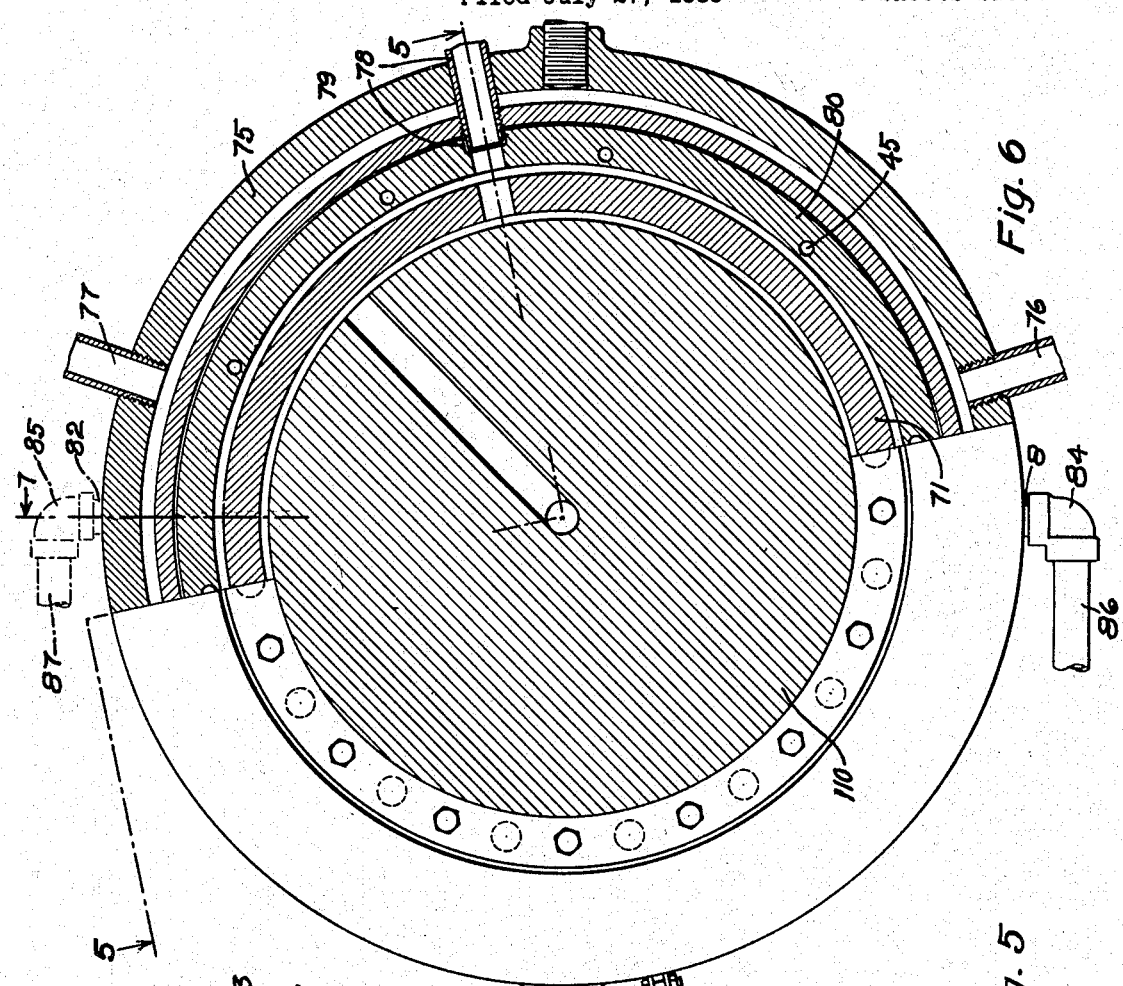
Figure 6 is an end view of the same, partially in section, on the lines 6—6, Figure 5.

The outer seal sleeve 74, instead of being air-cooled, is equipped with a water jacket 75. The jacket 75 is preferably made as a separate piece and sealed on the sleeve by sweating or other suitable method, but may obviously be cast integrally with the sleeve 74 if desired. Water inlet and outlet pipes 76 and 77 lead into the interior of jacket 75 as shown in Figure 6. The inlet fitting 78 for the pressure fluid is permanently screwed into the sleeve 74 and is sweated or otherwise sealed at its joint with the water-jacket 75. Due to this permanent attachment of the fluid fitting, the keyway 79 in the intermediate sleeve 80 is continued to the end of the sleeve to permit assembly or disassembly of the parts. The springs 109, pressing against the ring 32, are socketed in the wall of the jacket 75 as shown in Figure 7. The shields 102 and 103 in this form of the device are secured to the outside of the water-jacket 75.

In the operation of the device with compressed air on large shafts it may be desired to replenish the supply of lubricant in the chambers 43 and 44 without removal of the air pressure, and it is also desirable to permit exterior observation of the amount of oil supply. For this purpose an arrangement of the apparatus as illustrated in Figure 8 may be employed. Lower and upper oil pipes 81 and 82 are secured in the sleeve 74 as shown in Figure 7, and are suitably sealed around their joints with the water-jacket 75 as previously described. Holes 83 in the intermediate sleeve 80 place the oil pipes in communication with the chamber 44 and via the longitudinal holes 45, Figures 5 and 6, with the chamber 43.

Elbows 84 and 85 and horizontal pipes 86 and 87 connect the oil pipes 81 and 82 with a liquid level gage 88 having the usual glass column 89 and shut-off valves 90 and 91. A reserve tank 92 is adapted to feed oil through a shut-off cock 93, an adjustable sight-feed device 94, and the body of valve 91, into the column 89.

A pressure equalizing tube 95, provided with a shut-off cock 96, connects the top of the tank 92 with the main air supply pipe 97 which may be connected to the inlet fitting 78 via a flexible conduit 98. The numeral 99 indicates a main control means illustrated as a two-way cock adapted to supply compressed air to the seal and connected apparatus or to release the air therefrom through a nozzle 100.

When all the valves of the oil system are open, the air pressure throughout this system is equalized irrespective of the air pressure itself, so that the approximate oil level may be observed in the column 89 and additional oil may be fed at any required speed through the adjustable sight feed 94. To fill the tank 92 while the seal is under pressure, the cocks 92 and 96 may be closed and the normally air-tight cover 101 removed. After filling, the cover is replaced and the cocks reopened.

Obviously, oil retaining waste, shown in Figure 3, may be used in the chambers 43 and 44 of all sizes of the device.

To hold the stationary parts of the seal against tendency to rotate the following provision is made in the case of large units: Two short spuds or rods 103 and 104 are secured in the jacket 75 so as to project horizontally outward at opposite sides of the device. In installation, stationary stops 105 and 106 of any suitable form and illustrated in Figure 8 as forming part of pedestals 107 and 108, are disposed under the spuds 103 and 104. These stops are so spaced that they do not both engage their respective spuds at the same time, a slight clearance being allowed to permit floating of the seal in case of eccentricities in the shaft rotation. When the shaft 110 rotates clockwise, Figure 8, the spud 103 engages the stop 105 to hold the casing sleeve 74, intermediate sleeve 80, and related stationary parts against the rotational friction of the sealing surfaces. Similarly, during counter-clockwise rotation the spud 104 engages the stop 106 with the same result.

The provision of the above stop means operative in substantially horizontal alignment with the shaft center, in addition to preventing rotation as described, minimizes radial wear on the parts as follows:

Assuming clockwise rotation of the shaft, the spud 103 presses downward against the resistance of the stop 105. This action causes an upward reaction of the mass of the seal parts connected to the spud 103 which tends to lift these parts upward, and thereby neutralize the weight load imposed on the inner rotating sleeve 71, Figures 5 and 6. Wear between this sleeve and the intermediate sleeve 80 is thereby minimized, preventing the latter from wearing oval. This automatic neutralizing of the seal weight is of great importance in promoting long life and correct sealing alignment, especially with large and heavy seals.

If the case of counter-clockwise rotation, the action between spud 104 and stop 106 gives the same effect as described. Obviously if the shaft rotation is always in the same direction, one of the stops and its corresponding spud may be omitted. It will be seen that the structure throughout is such as to allow the stationary seal members freedom to float both radially and longitudinally in response to any small irregularities in alignment or shaft rotation.

While the invention has been described in preferred form, it is not limited to the precise structures illustrated, as various changes and modifications may be made without departing from the scope of the appended claims.

What is claimed is:

1. In a shaft seal, in combination, an inner sleeve adapted to encircle a rotary shaft, said shaft having a fluid opening within said sleeve and a passage connected with said opening, a pair of flange members at the ends of said sleeve and having opposed sealing faces, means to secure said sleeve and flange members to said shaft in fluidtight relationship, an intermediate sleeve on said first sleeve and having a sealing shoe engaging one of said sealing faces, an outer sleeve longitudinally slidable on said intermediate sleeve and having a sealing shoe engaging said other sealing face, resilient means urging said shoes against said faces, a fluid inlet fitting secured in said outer sleeve, means forming open passages for fluid from said fitting to said opening in said shaft, resilient means between said intermediate and outer sleeves to prevent escape of said fluid therebetween, and means to prevent rotation of said outer and intermediate sleeves.

2. A device as claimed in claim 1 wherein all said sleeves, said flanges, said fitting and said first and second resilient means comprise a unitary assembly removable as a whole from said shaft upon release of said securing means.

3. In a shaft seal for use on a rotary shaft, in combination, a pair of flanges secured to said shaft and having opposed sealing faces, an exterior sleeve, a sealing shoe on said sleeve and engaging one of said faces, a second sleeve longitudinally movable in said outer sleeve, a second sealing shoe on said second sleeve and engaging said other sealing face, said second sleeve having an outwardly tapered circumferential groove, a resilient ring in said groove and engaging the interior of said outer sleeve, resilient means urging said sleeves longitudinally to press said shoes against said faces, means to restrain said sleeves from rotation, and means to conduct a pressure fluid through said sleeves to said shaft.

4. In a shaft seal for use on a rotary shaft, in combination, a seal member secured to said shaft and rotatable thereby, said member having a sealing face, a second member about said shaft and having a shoe adapted to engage said sealing face in rotational sealing relation, resilient means urging said shoe against said face, a stationary stop, horizontal means rigid with said second member and adapted to abut said stop downwardly whereby said second member may be restrained from frictional rotation of said sealing faces and whereby the upward reaction of said restraint may neutralize weight of said second member on said shaft.

5. In a rotary seal for use on a shaft, in combination, two flanges secured to said shaft and having opposed annular sealing faces, a sleeve about said shaft, a shoe on said sleeve engaging one of said sealing faces, an outer sleeve longitudinally slidable on said first sleeve, a second shoe on said second sleeve and engaging said other sealing face, resilient sealing means between said sleeves, resilient means urging said shoes against said faces, and means to admit fluid pressure to said shaft within said shoes and sleeves, the diameter of sliding cylindrical engagement of said sleeves being substantially equal to the mean diameter of the areas of engagement between said shoes and faces and the effective areas of said sleeves and shoes outwardly responsive to said fluid pressure being small, whereby changes in frictional pressure between said shoes and faces may be small in proportion to changes in said fluid pressure.

6. In a gaseous pressure seal for use on a shaft, in combination, an inner sleeve, flanges on the ends of said sleeve and rigid therewith, means to secure said sleeve and flanges to said shaft, an intermediate sleeve mounted on said first sleeve in rotary and sliding relation and having a shoe face engaging one of said flanges, an outer sleeve longitudinally slidable on said intermediate sleeve and having a shoe face engaging said other flange, resilient means urging said sleeves into sealing relation with said flanges, resilient sealing means between said intermediate and outer sleeves, said sleeves being formed to comprise lubricant chambers within the ends thereof and longitudinally closed by said flanges, means forming open passages for a gaseous pressure fluid through said sleeves to said shaft, and means to restrain movement of lubricant from said chambers to said passages.

7. The invention claimed in claim 6 including means to restrain said intermediate and outer sleeves from rotation when said shaft is rotated, exterior means connected to said chambers to indicate the amount of lubricant in said chambers, and adjustable means to replenish said supply of lubricant while maintaining said gaseous pressure in said sleeves.

8. The invention claimed in claim 6 including means to restrain said intermediate and outer sleeves from rotation when said shaft is rotated, and cooling means on said outer sleeve.

9. The invention claimed in claim 6 including means to restrain said intermediate and outer sleeves from rotation, a water jacket on said outer sleeve, means to conduct water into and out of said jacket, said water conducting means including flexible conduits whereby said flanges may be free of rigid restraint by said conducting means.

LINDSAY H. BROWNE.